3,022,273
PROCESS FOR IMPROVING THE COLOR OF RESINS PRODUCED FROM ACROLEIN AND PENTAERYTHRITOL

Howard R. Guest, Charleston, Ben W. Kiff, Ona, and Calvert B. Halstead, St. Albans, W. Va., assignors to Union Carbide Corporation, a corporation of New York
No Drawing. Filed Mar. 12, 1959, Ser. No. 798,809
9 Claims. (Cl. 260—47)

This invention relates to resins formed from the reaction of acrolein and pentaerythritol. More specifically this invention relates to the use of phenyl dichlorophosphine in order to improve the color of such resins.

Resins formed from the reaction of acrolein with pentaerythritol in the presence of an acid catalyst are well known and are described in a number of publications. Depending on the reaction conditions chosen the reaction product of acrolein and pentaerythritol can vary from that of a liquid resin to that of the crystalline monomeric compound 3,9-divinyl-2,4,8,10-tetroxaspiro [5.5]undecane. The liquid resin is also known as the A-stage resin and contains some monomeric 3,9-divinyl-2,4,8,10-tetroxaspiro [5.5]undecane dissolved in various resinous polyethers. This liquid resinous mixture can be subsequently cured to a solid material by continued heating in the presence of acidic catalysts. A-stage resins and the reaction conditions employed for their production are described in U.S. Patent 2,401,776 and German Patent 870,032. The A-stage resinous liquid can also be modified in its properties by reaction with material containing vinyl unsaturation or material containing active hydrogen atoms and subsequently curing the mixture to a solid, again by heating in the presence of an acidic catalyst.

In the preparation of the A-stage resin acrolein and pentaerythritol are reacted in the molar ratios of about 1 to 2 moles of acrolein per mole of pentaerythritol and preferably 1.3 to 1.7 moles of acrolein per mole of pentaerythritol in the presence of an acid catalyst at temperatures of about 50° C. to about 125° C. and preferably from about 60° C. to about 100° C. to produce the more or less viscous liquid pre-condensate (A-stage) which slowly condenses to a solid plastic. If the catalyst is neutralized with an alkaline material or eliminated in some fashion such as by distillation or filtration the liquid A-stage resin can be stored for an indefinite period of time without solidifying. Since water is formed in the reaction of acrolein and pentaerythritol the water is usually distilled out of the liquid resin prior to its storage or curing to solid resins. When it is desired to produce a solid polymer from the neutral A-stage material an acidic catalyst is added and the liquid resin is heated at a temperature of about 50° C. to about 200° C. and preferably about 70° C. to about 150° C. to effect the cure. In some cases, however, it may be desirable to cure the resin directly after the formation of the A-stage without the elimination of the acid catalyst.

In the second method of producing acrolein-pentaerythritol resins acrolein and pentaerythritol are reacted under somewhat different conditions to produce monomeric 3,9-divinyl-2,4,8,10-tetroxaspiro [5.5]undecane, in high yields. This compound will be referred to herein as the monomeric divinyl compound. Compounds with active hydrogen atoms in their molecule add readily to the unsaturation of this material to form resins. Such resins and their method of manufacture are described in U.S. Patent 2,687,407. These resins are formed by reacting the monomeric divinyl compound with the active hydrogen compound at temperatures of about 60° C. to about 180° C. in the presence of acid catalysts, and preferably at a temperature of about 70° C. to about 150° C. The ratios of the reactants can vary from 0.25 to 4 functional groups of the unsaturated divinyl compound per each functional group of the material having an active hydrogen atom in its molecule and preferably at a ratio of from about 0.75 to 1.25. Illustratively, the unsaturated divinyl compound has 2 functional groups due to its two vinyl radicals; phenol has 3 functional groups due to the 3 unsubstituted active hydrogen positions ortho and para to the hydroxyl group; the functionality of a polyhydric alcohol is equal to the number of its hydroxyl groups; the functionality of a thiol is equal to the number of its thiol groups; while the functionality of hydrogen sulfide is 2.

The formation of solid resins containing either or both the A-stage liquid or the monomeric divinyl compound can be described as proceeding in two steps. The first step involves a resinification reaction which produces a liquid resin. This step manifests itself in the formation of the A-stage resins and also in the reaction of the unsaturated divinyl compound with materials containing active hydrogen atoms. This liquid resin may be cured by continued heating in the presence of the acid catalyst. However, some acids or acidic materials are good catalysts for the resinification reaction in producing a liquid resin but poor curing catalyst unless used in very larg quantities such as more than about 2% or 3% by weight based on the organic reactants. It is believed that this is due to a chemical combination of the catalyst and the resin and can be obviated by using a large excess of the catalyst such as over 2% based on the weight of the reactants. Those acidic materials which cure the liquid resins when less than about 2% by weight of the reactants is employed are referred to as acid curing catalysts. The second step involves the curing, wherein the liquid resin further polymerizes to form a solid thermoset infusible resin.

While the plastic materials produced by either of the two above described generic methods have many excellent properties such as hardness, toughness, and resistance to chemicals, unless great precautions are taken during their preparation, they have more or less color. This color may range from a very light yellow to brown depending upon the conditions of manufacture. This color formation has been noted in U.S. Patent 2,687,407 which urges the use of complex compounds of boron trifluoride, or complex halogeno acids, such as stannic chloride-hydrochloric acid complex, as color forming inhibitors and also as catalysts for the resinification reactions. However, these compounds have not been found to be entirley satisfactory for the removal of color.

It has now been found that when the curing reactions of the A-stage liquid or that of 3,9-divinyl-2,4,8,10-tetroxaspiro [5.5]undecane are conducted in contact with small quantities of phenyl dichlorophosphine the resulting polymer has greatly reduced color formation. The phenyl dichlorophosphine is preferably added to the reactants during the curing step and more preferably during the commencement of the curing step. The commencement of the curing step can be defined as that time when the acid catalyst is added which upon heating will produce a solid infusible resin. However, the phenyl dichlorophosphine can be added with beneficial results to the reactants or uncured resin at any time prior to solidification (cure) of the resin. It is preferable to admix or intimately disperse the phosphine with the reactants. Illustratively the color formation of the solid plastic will be greatly inhibited by adding phenyl dichlorophosphine to the reactants such as: the acrolein or pentaerythritol; a mixture of the unsaturated divinyl compound and a material containing active hydrogen atoms; the neutralized A-stage liquid simultaneously or after the curing catalyst has been added and while the resin is still in a liquid form; during the preparation of the A-stage liquid; during the reaction of the unsaturated divinyl compound with polyhydroxy alcohols; or during the curing of the A-stage with or without modifiers such as polyhydroxy compounds or compounds possessing vinyl saturation. In some instances it is desirable to add the phenyl dichlorophosphine during or at the commencement of the curing step. Such an instance arises when in the initial reaction of the unsaturated divinyl compound with a phenolic compound the phosphine is used as the acid catalyst and less than about 2% of the phosphine, based on the weight of the organic reactans is employed. The reason for this is believed to be that a part of the color inhibitor combines chemically in the original resinification reaction with the phenolic reactant and does not exist in its free state to perform its color inhibiting function. This can be avoided by adding more than about 2% of the phosphine or using another acid catalyst in conjunction with the phosphine. However, the color inhibiting effect of phenyl dichlorophosphine is not eliminated in the subsequent curing step when it is used to catalyze the original resinification (production of a liquid resin) of the A-stage liquid from acrolein and pentaerythritol or the resinification of the unsaturated divinyl compound with a polyhydroxy compound.

The quantity of phenyl dichlorophosphine used as a color inhibitor can range from about 0.1% to over 5% by weight of the sum weight of the reactants. It is preferable to add from about 0.5 to about 2% of the color inhibitor based on the weight of all the organic reactants of the resinous compositions. Phenyl dichlorophosphine is a water white liquid which is readily miscible with the polymer forming mixtures and is somewhat acidic in character. It can effectively catalyze the resinification reactions wherein a liquid resin is produced although phenyl dichlorophosphine is not considered a curing catalyst since large amounts are required to bring about a cure. Consequently, to make solid polymers of the mixtures of the liquid resins containing this color forming inhibitor the usual amount of conventional acidic curing catalysts are employed. The conventional acidic curing catalysts in this type of reaction are well known and include acidic materials such as sulfuric acid, fluorosulfonic acid, mixed alkanesulfonic acids, toluenesulfonic acid, benzenesulfonic acid, aluminum chloride, aluminum tetrasulfate, boron trifluoride, diethyl sulfate, and stannic chloride. The quantity of the acidic catalyst can vary over wide limits such as about 0.01% to about 5% and preferably about 0.1 to about 1.0% by weight based on the sum weight of the reactants.

Substances containing hydrogen atoms which can be reacted with the monomeric divinyl compound to form plastic materials include polyhydric alcohols, phenolic compounds and thiols. Active hydrogen atoms are also known as labile or reactive hydrogen atoms. A list of compounds possessing active hydrogen atoms and which can be used in the process of this invention can be found on pages 80 and 81 of vol. V of Organic Reactions (Wiley, 1949).

The alcohols employed can be polyhydric aliphatic alcohols having from 2 to 60 carbon atoms and preferably from 3 to 20 carbon atoms such as glycols, glycerols and higher polyhydric alcohols. The saturated acylic aliphatic alcohols are preferred. Illustrative of the alcohols are: ethylene glycol; propylene glycol; 1,10-decane diol; tetramethylene glycol; octadecane diol-1,12; glycerine; sorbitol; mannitol; pentaerythritol; 1,1,1-trihydroxy methyl propane; dipentaerythritol; tripentaerythritol; 1,5-pentanediol; dulcitol and 1,2,6-hexanetriol. The polyhydric alcohol can also be a polymeric product such as polyoxyalkylene glycols, e.g., polyoxyalkylene glycol and polyoxypropylene glycol particularly those having molecular weights up to about 400.

The phenolic compounds add to the unsaturated divinyl compound by the active hydrogen atoms in positions ortho and para to the phenolic group. Thus at least two positions ortho or para to the hydroxyl group or groups of the phenolic compound must be unsubstituted. The phenolic compounds employed can be mononuclear, polynuclear, monohydric or polyhydric. The phenolic compounds can have alkyl substituents which can be saturated or unsaturated and which can contain from 1 to about 15 carbon atoms. Also the aryl substituents of the polynuclear phenolic compounds can be linked to each other with aliphatic radicals. Illustrative of the phenolic compounds are: phenol; cresols; chlorophenols; resorcinol; 1,2 - bis( - hydroxyphenyl) ethane; 2,2 - bis(p - hydroxyphenyl) propane; methylene bis(3,5-xylenol); 1,1,3-tris (hydroxyphenyl) propane; 1,1,3-tris (hydroxytolyl) propane; 1,1,3-tris (p-hydroxyphenyl) propene-2; 1,1,2,2-tetrakis (hydroxyphenyl) ethane; 1,1,5,5-tetrakis (p-hydroxyphenyl) pentane; 1,1,6,6-tetrakis (o-hydroxyphenyl) hexan-2-ol; and the like.

Illustrative of the mercapto alcohols are 2-mercaptoethanol; 2-mercapto-1-propanol, 1-thioglycerol; 1,2-dithioglycerol; mercaptophenol; dimercaptophenol and the like.

The resins formed by reacting the A-stage liquid with modifiers such as the unsaturated vinyl compounds e.g., the 3,9-divinyl-2,4,8,10-tetroxaspiro [5.5]undecane and substances possessing active hydrogen atoms are produced by heating the reactants at temperatures of about 50° C. to 150° C. in the presence of an acid catalyst. Again it is preferable to cure the resins with an acid catalyst which can effect the cure when less than about 2% of the catalyst is used, i.e. a curing catalyst. The resin can contain up to 50% by weight of such modifiers although preferably the A-stage resin contains up to about 25% by weight of the modifiers. The A-stage resin can be considered to contain active hydrogen atoms since it possesses free hydroxyl groups. The A-stage resin also contains vinyl unsaturation. The following examples and experiments are illustrative of the invention.

EXPERIMENT 1

This experiment demonstrates the production of a resin in the conventional manner with no phenyl dichlorophosphine added.

To a 10 gallon autoclave there were charged 29.8 pounds of 95.5 percent acrolein, 41.6 pounds of pentaerythritol and 112 g. of 37 percent hydrochloric acid in 112 g of water. The mixture was heated to 68° C. to 76° C. for 52 minutes. At the conclusion of the reaction period volatile material was distilled off to a kettle temperature of 75° C./4 mm. The resulting A-stage material was a fairly viscous liquid.

To 150 g. of this resin there was added 0.45 g. of mixed alkanesulfonic acids. The mixture was heated at 70° C. for 15 minutes and then poured into molds and cured for eight hours at 100° C. The resulting polymer had excellent properties, but when the color was tested the blue light reflectance through a section of ½" thick was only 19 percent.

EXPERIMENT 2

This experiment demonstrates the use of boron trifluoride as curing catalyst as Orth teaches in U.S. Patent 2,687,407:

A mixture of 221 g. of 96.2 percent acrolein, 310 g. pentaerythritol, and 2187 g. of 37 percent hydrochloric acid was reacted at 71–73° C. for one and one half hours in a nitrogen atmosphere. At the conclusion of the reaction the volatile material was stripped off to a kettle temperature of 73° C./5 mm. To 85 g. of the resulting A-stage resin there was added 3.67 g. of a solution of 10.9 percent boron trifluoride in tetrahydrofuran. An additional 22 g. of tetrahydrofuran was added and the solution sparged with nitrogen to insure complete mixing. The solvent was removed by stripping to a kettle temperature of 79° C./3 mm. while the nitrogen atmosphere was maintained. The stripped mixture was poured into molds and cured at 70° C. for 16 hours. The resulting polymer had good properties, but the blue light reflectance through a section ½" thick was only 20 percent.

Example 1

This example demonstrates the improvement in color resulting from the presence of phenyl dichlorophosphine during the curing operation.

An A-stage resin was prepared by reacting 534 g. of acrolein (96 percent) and 750 g. of pentaerythritol using 10 g. of phosphoric acid catalyst. After reaction at 74° C. for five hours the volatile material was stripped off to a kettle temperature of 76° C. at 5 mm. The residue A-stage liquid was practically water-white.

A portion of this material was cured at 100° C. for 16 hours using 0.3 percent alkanesulfonic acid. The blue light reflectance through a section of the cured polymer ½" thick was 20 percent.

Another portion of the same resin was cured in the same fashion with alkanesulfonic acid, but one percent phenyl dichlorophosphine was added to the A-stage liquid before it was heated. The blue light reflectance through a section of the cured polymer ½" thick was 43 percent.

Example 2

This example describes the production of a polymer with very good color with the aid of phenyl dichlorophosphine.

An A-stage resin was made in the manner described above using phosphoric acid catalyst. To a portion of this there was added 0.2 percent fluorosulfonic acid and 1.0 percent phenyl dichlorophosphine. The material was heated for 16 hours at 70° C. The blue light reflectance of a section of the cured polymer ½" thick was 54 percent.

Example 3

This example shows the improvement in color of resins made from 3,9-divinyl-2,4,8,10-tetroxaspiro [5.5]-undecane and phenol when phenyl dichlorophosphine was present in the curing step as compared to a resin wherein a small quantity of the phosphine was used to catalize the liquid resinification of the reactants.

A liquid pre-condensate was prepared by reacting 317 g. of 3,9-divinyl-2,4,8,10-tetroxaspiro [5.5]undecane (1.5 moles) with 94 g. phenol (1.0 mole) with 0.25 percent phenyl dichlorophosphine catalyst for one hour at 100° C.

To a portion of this liquid resin there was added 0.2 percent of alkanesulfonic acids. After a short reaction period of 15 minutes at 100° C. this mixture was poured into molds and cured for three hours at 100° C. The resulting polymer was a hard, smooth, glossy solid. The color was very dark brown, which is characteristic of resins of this kind.

To another portion of the liquid pre-condensate there was added 0.2 percent of alkanesulfonic acid and one percent of phenyl dichlorophosphine. After a preliminary reaction at 100° C. for 15 minutes the material was poured into molds and cured for three hours at 100° C. The resulting polymer was a hard, smooth, glossy solid. The polymer was transparent and was straw-colored. This was exceptional for a polymer containing phenol as a component.

What is claimed is:

1. In the process for producing solid resins by reacting acrolein with pentaerythritol in a ratio of from about 1 to about 2 moles of said acrolein per mole of said pentaerythritol, at a temperature of from about 50° C. to about 125° C. and in contact with an acid catalyst, to form a liquid resin which is subsequently cured by heating said liquid resin in contact with an acid catalyst, the improvement which comprises curing said liquid resin in contact with an amount of phenyl dichlorophosphine sufficient to inhibit color formation in the resulting solid resinous product.

2. In the process for producing solid resins by reacting acrolein with pentaerythritol in a ratio of from about 1 to about 2 moles of said acrolein per mole of said pentaerythritol, at a temperature of from about 50° C. to about 125° C. and in contact with an acid catalyst, to form a liquid resin which is subsequently cured by heating said liquid resin in contact with an acid catalyst, the improvement which comprises curing said liquid resin in contact with from about 0.1 percent to about 5 percent by weight of phenyl dichlorophosphine based upon the weight of said liquid resin.

3. In the process for producing solid resins by reacting acrolein with pentaerythritol in a ratio of from about 1 to about 2 moles of said acrolein per mole of said pentaerythritol, at a temperature of from about 50° C. to about 125° C. and in contact with an acid catalyst, to form a liquid resin which is subsequently modified by reaction with 3,9-divinyl-2,4,8,10-tetroxaspiro (5.5)undecane in a ratio of from about 0.25 to about 4 functional groups of said 3,9-divinyl-2,4,8,10-tetroxaspiro (5.5)undecane per functional group of said liquid resin, at a temperature of from about 50° C. to about 150° C. and in contact with an acid catalyst, and thereafter cured by heating the modified liquid resin in contact with an acid catalyst, the improvement which comprises curing the modified liquid resin in contact with an amount of phenyl dichlorophosphine sufficient to inhibit color formation in the resulting solid resinous product.

4. In the process for producing solid resins by reacting 3,9-divinyl-2,4,8,10-tetroxaspiro (5.5)undecane with an active hydrogen-containing organic compound selected from the group consisting of the polyhydric aliphatic alcohols and the phenols in a ratio of from about 0.25 to about 4 functional groups of said 3,9-divinyl-2,4,8,10-tetroxaspiro (5.5)undecane per functional group of said active hydrogen-containing organic compound, at a temperature of from about 60° C. to about 180° C. and in contact with an acid catalyst, to form a liquid resin which is subsequently cured by heating said liquid resin in contact with an acid catalyst, the improvement which comprises curing said liquid resin in contact with an amount of phenyl dichlorophosphine sufficient to inhibit color formation in the resulting solid resinous product.

5. In the process for producing solid resins by reacting 3,9-divinyl-2,4,8,10-tetroxaspiro (5.5)undecane with an active hydrogen-containing compound selected from the group consisting of the polyhydric aliphatic alcohols and the phenols in a ratio of from about 0.25 to about 4 functional groups of said 3,9-divinyl-2,4,8,10-tetroxaspiro (5.5)undecane per functional group of said active hydrogen-containing organic compound, at a temperature of from about 60° C. to about 180° C. and in contact with an acid catalyst, to form a liquid resin which is subsequently cured by heating said liquid resin in contact with an acid catalyst, the improvement which comprises curing said liquid resin in contact with from about 0.1 percent to about 5 percent by weight of phenyl dichlorophosphine based upon the weight of said liquid resin.

6. The process according to claim 5 wherein the active hydrogen-containing compound is a polyhydric aliphatic alcohol.

7. The process according to claim 5 wherein the active hydrogen-containing compound is a dihydric saturated aliphatic alcohol.

8. The process according to claim 5 wherein the active hydrogen-containing compound is a mononuclear phenol.

9. The process according to claim 5 wherein the active hydrogen-containing compound is phenol.

References Cited in the file of this patent

UNITED STATES PATENTS

| | | |
|---|---|---|
| 2,687,407 | Orth | Aug. 24, 1954 |

FOREIGN PATENTS

| | | |
|---|---|---|
| 568,288 | Great Britain | Mar. 28, 1945 |